United States Patent
Li (10) Patent No.: US 10,136,047 B2
(45) Date of Patent: Nov. 20, 2018

(54) FOCUSING METHOD AND DEVICE FOR IMAGE SHOOTING

(71) Applicant: ZTE CORPORATION, Shenzhen, Guangdong Province (CN)

(72) Inventor: Zhao Li, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/316,030

(22) PCT Filed: Aug. 4, 2014

(86) PCT No.: PCT/CN2014/083653
§ 371 (c)(1),
(2) Date: Dec. 2, 2016

(87) PCT Pub. No.: WO2015/131483
PCT Pub. Date: Sep. 11, 2015

(65) Prior Publication Data
US 2017/0126956 A1      May 4, 2017

(30) Foreign Application Priority Data
Jun. 5, 2014   (CN) .......................... 2014 1 0247257

(51) Int. Cl.
*H04N 5/232* (2006.01)
*H04N 5/225* (2006.01)
*H04N 5/235* (2006.01)

(52) U.S. Cl.
CPC ....... *H04N 5/23212* (2013.01); *H04N 5/2256* (2013.01); *H04N 5/232* (2013.01);
(Continued)

(58) Field of Classification Search
CPC .................................................. H04N 5/23212
(Continued)

(56) References Cited

U.S. PATENT DOCUMENTS 5,270,748 A   12/1993  Katz
5,861,936 A   1/1999   Sorensen
(Continued)

FOREIGN PATENT DOCUMENTS

CN    101141567 A    3/2008
CN    101995731 A    3/2011
(Continued)

OTHER PUBLICATIONS

International Search Report and Written Opinion dated Mar. 11, 2015 for PCT Application No. PCT/CN2014/083653.
(Continued)

*Primary Examiner* — Joel Fosselman
(74) *Attorney, Agent, or Firm* — Plumsea Law Group, LLC (57) ABSTRACT

The present document discloses a method for processing image shooting applied to an electronic device with an image shooting function, the electronic device is equipped with an auxiliary focusing light source, and the method includes: activating an auxiliary light source to emit auxiliary light when the electronic device opens an image shooting mode; and determining a first area on a screen of the electronic device according to reflected light received on the screen of the electronic device, and calculating a focusing point coordinate of image shooting according to the first area. The present document also discloses an apparatus for processing image shooting.

20 Claims, 4 Drawing Sheets

---

101. Activate an auxiliary light source to emit auxiliary light when the electronic device opens an image shooting mode

↓

102. Determine a first area on a screen of the electronic device according to reflected light received on the screen of the electronic device, and calculating a focusing point coordinate of image shooting according to the first area (52) U.S. Cl.
CPC ....... *H04N 5/2351* (2013.01); *H04N 5/23216* (2013.01); *H05K 999/99* (2013.01)

(58) Field of Classification Search
USPC .......................................................... 348/349
See application file for complete search history.

(56) References Cited

U.S. PATENT DOCUMENTS

| | | | |
|---|---|---|---|
| 8,199,247 B2* | 6/2012 | Chou | G03B 13/32 |
| | | | 348/349 |
| 2001/0005230 A1 | 6/2001 | Ishikawa | |
| 2003/0179310 A1* | 9/2003 | Irie | H04N 5/2351 |
| | | | 348/349 |
| 2010/0220291 A1 | 9/2010 | Horning et al. | |
| 2013/0005230 A1 | 6/2013 | Hill et al. | |
| 2013/0155309 A1 | 6/2013 | Hill et al. | |
| 2013/0194164 A1 | 8/2013 | Sugden et al. | |

FOREIGN PATENT DOCUMENTS

| | | |
|---|---|---|
| CN | 102006819 A | 4/2011 |
| CN | 103905709 A | 7/2014 |
| JP | 07311330 | 11/1995 |
| KR | 100134761 B1 | 4/1998 |

OTHER PUBLICATIONS

Office Action dated Jun. 14, 2017 for Korean Patent Application No. 10-2016-7033868.
Extended European Search Report dated Mar. 27, 2017 for European Patent Application No. 14884399.8.

* cited by examiner

FOCUSING METHOD AND DEVICE FOR IMAGE SHOOTING

CROSS-REFERENCE TO RELATED APPLICATION(S)

This application is the U.S. National Phase application of PCT application number PCT/CN2014/083653 having a PCT filing date of Aug. 4, 2014, which claims priority of Chinese patent application 201410247257.7 filed on Jun. 5, 2013, the disclosures of which are hereby incorporated by reference.

TECHNICAL FIELD

The present document relates to the technical field of intelligent electronic devices, and particularly, to a method and apparatus for processing image shooting.

BACKGROUND OF THE RELATED ART

At present, the development of communication terminals changes with each passing day, intelligent terminals become a predominant development tendency, and a camera shooting function of the intelligent terminals has become one of essential functions. In addition, since users also hope to record every landscape around through portable terminals carried daily, the requirements on shooting also become increasingly higher, even it is desired to reach standard of specialized cameras. For example, it is desirable to be able to select a focusing point to generate shooting with Bokeh effect.

In the related art, although an intelligent terminal can support a user to independently select shooting a focusing point, the process thereof is required to be completed by the user manually by touching a screen. This process, no matter the screen is first touched to select the focusing point to focus and then press a shooting key, or the screen is touched to complete selection of the focusing point to focus at a time and to shoot pictures or videos, will unavoidably result in focal shift due to equipment shaking caused by touching. Moreover, sometimes because the user holds other things in his hands or an screen of a device is larger, selecting the focusing point will be very difficult, which brings inconvenience to practical applications, and the user experience is bad.

SUMMARY OF THE INVENTION

In order to solve the existing technical problem, the embodiments of the present document provide a method and apparatus for processing image shooting.

A method for processing image shooting provided in the embodiment of the present document is applied to an electronic device with an image shooting function and is equipped with an auxiliary focusing light source, and the method comprises:

activating an auxiliary light source to emit auxiliary light when the electronic device opens an image shooting mode; and determining a first area on a screen of the electronic device according to reflected light received on the screen of the electronic device, and calculating a focusing point coordinate of image shooting according to the first area.

Preferably, determining a first area on a screen of the electronic device according to reflected light received on the screen of the electronic device and calculating a focusing point coordinate of image shooting according to the first area comprises:

determining a reflection area on the screen according to the reflected light received on the screen of the electronic device, and obtaining reflected light intensity distribution information in the reflection area; and determining the first area with the highest light intensity according to the reflected light intensity distribution information in the reflection area, calculating a geometric center position coordinate of the first area, and determining the calculated geometric center position coordinate as the focusing point coordinate of image shooting.

Preferably, a plurality of photoinduction points are provided at corresponding positions in the screen of the electronic device, and position coordinates of all of the photoinduction points are saved in the electronic device;

determining a reflection area on the screen according to the reflected light received on the screen of the electronic device and obtaining reflected light intensity distribution information in the reflection area comprises:

constructing the reflection area according to photoinduction points which receive the reflected light in the electronic device, obtaining a light intensity value of each photoinduction point in the reflection area, and saving a corresponding relationship between a position coordinate of each photoinduction point and the light intensity value in the reflection area, wherein position coordinates of all of the photoinduction points in the reflection area and the corresponding light intensity values thereof constitute the reflected light intensity distribution information in the reflection area.

Preferably, determining the first area with the highest light intensity according to the reflected light intensity distribution information in the reflection area comprises:

comparing light intensity values of all of the photoinduction points in the reflection area with a preset first light intensity threshold value, selecting photoinduction points, in which a time during which the light intensity values are kept to be greater than or equal to the first light intensity threshold value reaches a preset first time, to constitute the first area, and recording the position coordinates of all of the photoinduction points in the first area.

Preferably, calculating a geometric center position coordinate of the first area comprises:

acquiring position coordinates $(X1, Y1), \ldots, (Xn, Yn)$ of photoinduction points located around an edge of the first area, and calculating the geometric center position coordinate as $((X1+\ldots+Xn)/n, (Y1+\ldots+Yn)/n)$ according to the acquired position coordinates of the photoinduction points;

wherein, an abscissa of the geometric center position coordinate is a sum of abscissas of all of the photoinduction points around the edge of the first area divided by n, and an ordinate of the geometric center position coordinate is a sum of ordinates of all of the photoinduction points around the edge of the first area divided by n;

wherein, n is an integer greater than 1.

Preferably, the method further comprises:

if video shooting, after the electronic device opens the image shooting mode and determines the focusing point coordinate and in a video shooting process, tracing the reflection area on the screen and a change in the reflected light intensity distribution information in the reflection area in real time according to the reflected light received on the screen of the electronic device, and updating the first area in real time according to the change, and updating the focusing point coordinate.

Preferably, in a video shooting process, tracing the reflection area on the screen and a change in the reflected light intensity distribution information in the reflection area in real time according to the reflected light received on the screen of the electronic device and updating the first area in real time according to the change comprises:

constructing a new reflection area in real time according to the photoinduction points receiving the reflected light in the electronic device, obtaining a light intensity value of each photoinduction point in the new reflection area, and saving a corresponding relationship between a position coordinate of each photoinduction point and the light intensity value in the new reflection area; comparing light intensity values of all of the photoinduction points in the new reflection area with a preset first light intensity threshold value, selecting photoinduction points, in which a time during which the light intensity values are kept to be greater than or equal to the first light intensity threshold value reaches a preset second time, to constitute a new first area, and recording position coordinates of all of the photoinduction points in the new first area;

wherein, a length of the second time is less than or equal to a length of the first time.

The embodiment of the present document further provides an apparatus for processing image shooting applied to an electronic device with an image shooting function, the electronic device is equipped with an auxiliary focusing light source, and the apparatus comprises:

an auxiliary light module, arranged to activate an auxiliary light source to emit auxiliary light when the electronic device opens an image shooting mode; and a focusing module, arranged to determine a first area on a screen of the electronic device according to reflected light received on the screen of the electronic device, and calculate a focusing point coordinate of image shooting according to the first area.

Preferably, the focusing module comprises:

a photoinduction submodule, arranged to determine a reflection area on the screen according to the reflected light received on the screen of the electronic device, and obtain reflected light intensity distribution information in the reflection area; and a focusing point calibration submodule, arranged to determine the first area with the highest light intensity according to the reflected light intensity distribution information in the reflection area, calculate a geometric center position coordinate of the first area, and determine the calculated geometric center position coordinate as the focusing point coordinate of image shooting.

Preferably, a plurality of photoinduction points are provided at corresponding positions in the screen of the electronic device, and position coordinates of all of the photoinduction points are saved in the electronic device;

the photoinduction submodule is further arranged to construct the reflection area according to photoinduction points which receive the reflected light in the electronic device, obtain a light intensity value of each photoinduction point in the reflection area, and save a corresponding relationship between a position coordinate of each photoinduction point and the light intensity value in the reflection area, wherein position coordinates of all of the photoinduction points in the reflection area and the corresponding light intensity values thereof constitute the reflected light intensity distribution information in the reflection area.

Preferably, the focusing point calibration submodule is further arranged to compare light intensity values of all of the photoinduction points in the reflection area with a preset first light intensity threshold value, select photoinduction points, in which a time during which the light intensity values are kept to be greater than or equal to the first light intensity threshold value reaches a preset first time, to constitute the first area, and record the position coordinates of all of the photoinduction points in the first area.

Preferably, the focusing point calibration submodule is further arranged to calculate the geometric center position coordinate of the first area by the following way:

acquiring position coordinates $(X1, Y1), \ldots, (Xn, Yn)$ of photoinduction points located around an edge of the first area, and calculating the geometric center position coordinate as $((X1+ \ldots +Xn)/n, (Y1+ \ldots +Yn)/n)$ according to the acquired position coordinates of the photoinduction points;

wherein, an abscissa of the geometric center position coordinate is a sum of abscissas of all of the photoinduction points around the edge of the first area divided by n, and an ordinate of the geometric center position coordinate is a sum of ordinates of all of the photoinduction points around the edge of the first area divided by n;

wherein, n is an integer greater than 1.

Preferably, in the case of video shooting, after the electronic device opens the image shooting mode and determines the focusing point coordinate, the photoinduction submodule is further arranged to, in a video shooting process, trace the reflection area on the screen and a change in the reflected light intensity distribution information in the reflection area in real time according to the reflected light received on the screen of the electronic device; and the focusing point calibration submodule is further arranged to update the first area in real time according to the change, and update the focusing point coordinate.

Preferably, the photoinduction submodule is further arranged to, in the video shooting process, construct a new reflection area in real time according to the photoinduction points receiving the reflected light in the electronic device, obtain a light intensity value of each photoinduction point in the new reflection area, and save a corresponding relationship between a position coordinate of each photoinduction point and the light intensity value in the new reflection area; and the focusing point calibration submodule is further arranged to compare light intensity values of all of the photoinduction points in the new reflection area with a preset first light intensity threshold value, select photoinduction points, in which a time during which the light intensity values are kept to be greater than or equal to the first light intensity threshold value reaches a preset second time, to constitute a new first area, and record position coordinates of all of the photoinduction points in the new first area;

wherein, a length of the second time is less than or equal to a length of the first time.

The embodiment of the present document further provides a computer readable storage medium comprising a set of computer executable instructions which are used for executing the method for processing image shooting described in the embodiment of the present document.

The method and apparatus for processing image shooting provided in the embodiments of the present document can activate an auxiliary light source to emit auxiliary light to human eyes when an electronic device opens an image shooting mode, calculate a focusing point coordinate using an overlapping area formed by reflected light of the human eyes on a screen of the electronic device, and further complete automatic focusing. The focusing process in the embodiments of the present document is entirely completed automatically by the electronic device without a manual operation by the user, such that focal shift resulted from equipment shaking caused by touching in the manual operation is also avoided.

PREFERRED EMBODIMENTS OF THE INVENTION

The technical scheme of the present document will be further described in detail in combination with the accompanying drawings and specific embodiments below.

In order to achieve automatic focusing in an image shooting process, in an embodiment of the present document, an auxiliary focusing light source is set in an electronic device with an image shooting function; the auxiliary focusing light source emits auxiliary light when an image shooting mode is opened, while a user gazes at a certain position on a screen of the electronic device; the auxiliary light shoots into eyeball corneas of the user and is reflected back to the screen of the electronic device; the electronic device captures light reflection areas through photoinduction points, and determines a focusing point coordinate of image shooting accordingly, thereby completing automatic focusing.

Figure 1:
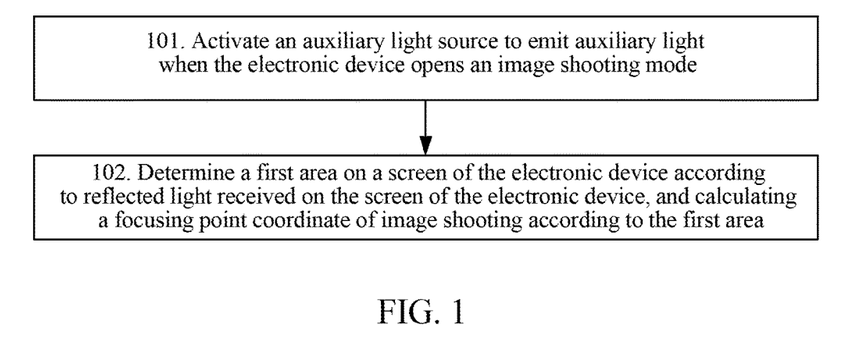
FIG. 1 is a flow chart of a method for processing image shooting according to an embodiment of the present document.

Therefore, the embodiment of the present document provides a method for processing image shooting applied to an electronic device with an image shooting function, the electronic device is equipped with an auxiliary focusing light source. As shown in FIG. 1, the method mainly includes the following steps.

In step 101, when the electronic device opens an image shooting mode, an auxiliary light source is activated to emit auxiliary light.

Figure 2:
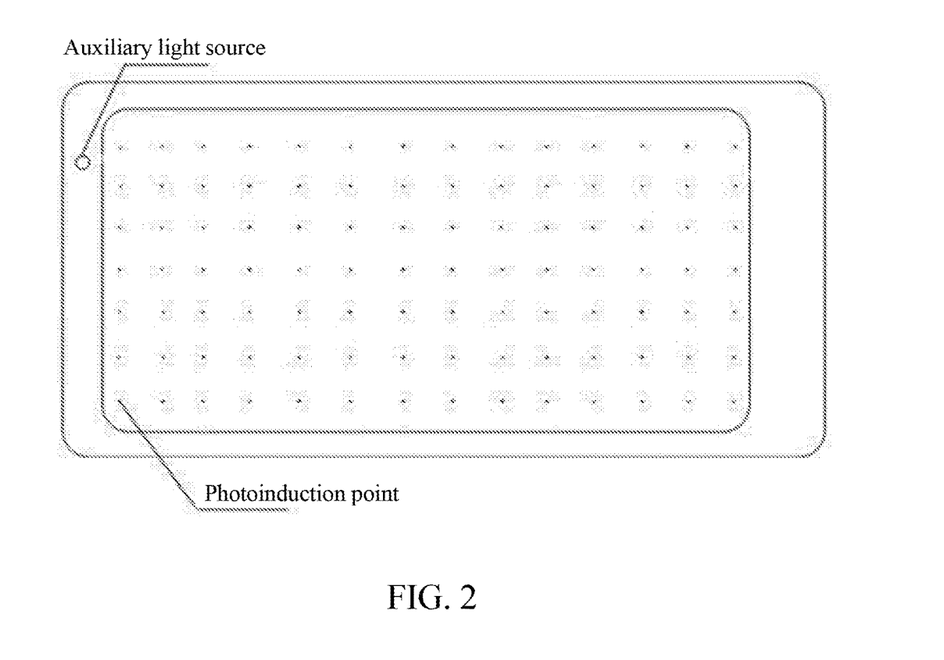
FIG. 2 is a schematic diagram of positions and distribution of an auxiliary light source and photoinduction points in an embodiment of the present document.

The auxiliary focusing light source can be provided at the same side as a screen of the electronic device, for example, it can be provided beside a camera of the electronic device. As shown in FIG. 2, the electronic device activates the auxiliary light source for auxiliary light emission when the image shooting mode is opened.

In step 102, according to reflected light received on the screen of the electronic device, a first area on the screen of the electronic device is determined, and a focusing point coordinate of image shooting is calculated according to the first area.

One preferred execution process of the step 102 includes:
determining a reflection area on the screen according to the reflected light received on the screen of the electronic device, and obtaining reflected light intensity distribution information in the reflection area; and
determining the first area with the highest light intensity according to the reflected light intensity distribution information in the reflection area, calculating a geometric center position coordinate of the first area, and determining the calculated geometric center position coordinate as the focusing point coordinate of image shooting.

Figure 3:
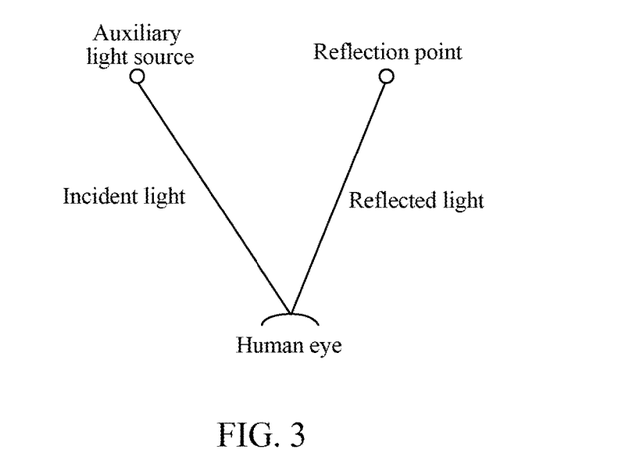
FIG. 3 is a schematic diagram of a principle of an auxiliary light reflection in an embodiment of the present document.

The application scenario of the embodiment of the present document is that, when the electronic device opens the image shooting mode, the user keeps the side of the screen of the electronic device facing toward the user's face, and the user gazes at a certain position on the screen of the electronic device, which is a position that the user hopes to focus on; at this point, a portion of the auxiliary light emitted by the auxiliary light source will enter the user's eyeball. The auxiliary light entering the eyeball will be reflected through reflex action of the eyeball corneas. The electronic device receives the reflected light reflected back to the screen through photoinduction points, determines a reflection area on the screen accordingly, and obtains reflected light intensity distribution information in the reflection area. A schematic diagram of a principle of an auxiliary light reflection is as shown in FIG. 3.

Specifically, a plurality of photoinduction points are provided at corresponding positions in the screen of the electronic device. These photoinduction points can be regularly arranged in a dot matrix. As shown in FIG. 2, position coordinates of all of the photoinduction points are saved in the electronic device;

wherein, determining a reflection area on the screen according to the reflected light received on the screen of the electronic device and obtaining reflected light intensity distribution information in the reflection area comprises:
constructing the reflection area according to photoinduction points which receive the reflected light in the electronic device, obtaining a light intensity value of each photoinduction point in the reflection area, and saving a corresponding relationship between a position coordinate of each photoinduction point and the light intensity value in the reflection area, wherein position coordinates of all of the photoinduction points in the reflection area and the corresponding light intensity values thereof constitute the reflected light intensity distribution information in the reflection area. That is to say, the reflected light intensity distribution information includes the position coordinate of each of the photoinduction points in the reflection area and its corresponding light intensity value.

Determining the first area with the highest light intensity according to the reflected light intensity distribution information in the reflection area comprises:
comparing light intensity values of all of the photoinduction points in the reflection area with a preset first light intensity threshold value, selecting photoinduction points in which a time during which the light intensity values are kept to be greater than or equal to the first light intensity threshold value reaches a preset first time to constitute the first area, and recording the position coordinates of all of the photoinduction points in the first area.

Figure 4:
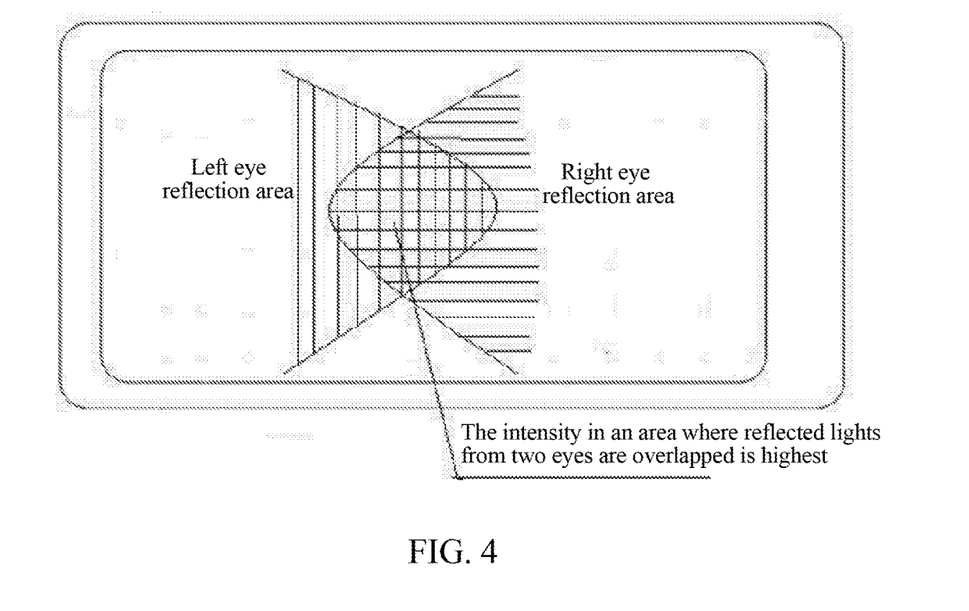
FIG. 4 is a schematic diagram of reflected lights forming reflection areas on a screen in an embodiment of the present document.

As shown in FIG. 4, which is a schematic diagram of reflected lights forming reflection areas on a screen of an electronic device in an embodiment of the present document. Because both eyes of the user will generate mirror reflection to auxiliary light emitted by an auxiliary light source, photoinduction points of the electronic device actually will simultaneously receive reflected light reflected by the right eye and left eye respectively, and an area in which sight lines from the right eye overlap with those from the left eye is an area which is imaged in the user's eyes actually and in which light intensity is the highest due to a specular reflection principle of corneas. In the embodiment of the present document, light intensity values of all of the photoinduction points in the reflection area are compared with a preset first light intensity threshold value, that is, photoinduction points receiving the highest light intensity are screened out. As long as the light intensity of these photoinduction points can be kept for a certain time (a preset first time), it is showed that the user has gazed at a certain position area on the screen for a long time, then the electronic device considers that the user has selected a position area of interest at this point, and selects these photoinduction points as photoinduction points forming the first area, and then records position coordinates of these photoinduction points.

Calculating the geometric center position coordinate of the first area comprises:

acquiring position coordinates $(X1, Y1), \ldots, (Xn, Yn)$ of photoinduction points located around the edge of the first area, and calculating the geometric center position coordinate as $((X1+ \ldots +Xn)/n, (Y1+ \ldots +Yn)/n)$ according to the acquired position coordinates of the photoinduction points;

that is, an abscissa of the geometric center position coordinate is a sum of abscissas of all of the photoinduction points around the edge of the first area divided by n, and an ordinate of the geometric center position coordinate is a sum of ordinates of all of the photoinduction points around the edge of the first area divided by n;

wherein, n is an integer greater than 1.

It should be noted that the way described in the embodiment of the present document is not only applied to automatic focusing during photo shooting, but also applied to automatic focusing during video shooting. In one preferred embodiment, if the video shooting, after the electronic device opens the image shooting mode and determines the focusing point coordinate, in a video shooting process, the reflection area on the screen and a change in the reflected light intensity distribution information in the reflection area are traced in real time according to the reflected light received on the screen of the electronic device, the first area in real time is updated according to the change and the focusing point coordinate is updated.

Specifically, a new reflection area is constructed in real time according to the photoinduction points receiving the reflected light in the electronic device, a light intensity value of each photoinduction point in the new reflection area is obtained, and a corresponding relationship between the position coordinate of each photoinduction point and the light intensity value in the new reflection area is saved; light intensity values of all of the photoinduction points in the new reflection area are compared with a preset first light intensity threshold value, photoinduction points in which a time during which the light intensity values are kept to be greater than or equal to the first light intensity threshold value reaches a preset second time are selected to constitute a new first area, and the position coordinates of all of the photoinduction points in the new first area are recorded, wherein a length of the second time is less than or equal to a length of the first time.

A new focusing point coordinate is recalculated according to position coordinates of all of infrared sensors in the new first area.

In the method embodiment of the present document, by capturing a position area on the screen of the electronic device at which the user's eyes gaze during the image shooting and calculating the focusing point coordinate according to the area, automatic focusing is completed. Thus, through the embodiment of the present document, a manual operation by the user is omitted, and focal shift resulted from equipment shaking caused by touching in the manual operation is also avoided.

It should be noted that the auxiliary light source in the embodiment of the present document can be an infrared light source and the like that are not harmful to human eyes. In addition, since a wavelength range of infrared light is 0.75~1000 microns and an infrared irradiation range emitted by a human body is 8~12 microns, if the infrared light source also uses a light source approximating to the infrared wavelength emitted by the human body, it is more possible that errors occur in the infrared sensor (i.e. the photoinduction point described above) upon reception. Therefore, the wavelength of the infrared light source in the embodiment of the present document should be excluded from the range of the infrared wavelength of the human body. Preferably, intermediate and near infrared wavelength of 0.74~4 microns may be selected for the infrared light source of the embodiment of the present document.

Figure 5:
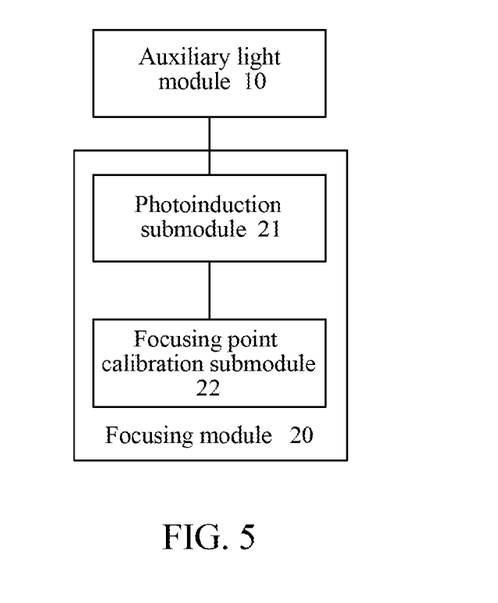
FIG. 5 is a schematic diagram of a structure of an apparatus for processing image shooting according to an embodiment of the present document.

Corresponding to the method for processing image shooting of the embodiment of the present document, the embodiment of the present document also provides an apparatus for processing image shooting. The apparatus is applied to an electronic device with an image shooting function, and the electronic device is equipped with an auxiliary focusing light source. As shown in FIG. 5, the apparatus includes:

an auxiliary light module 10 arranged to activate an auxiliary light source to emit auxiliary light when the electronic device opens an image shooting mode; and a focusing module 20 arranged to determine a first area on a screen of the electronic device according to reflected light received on the screen of the electronic device and calculate a focusing point coordinate of image shooting according to the first area.

Preferably, the focusing module 20 comprises:

a photoinduction submodule 21 arranged to determine a reflection area on the screen according to the reflected light received on the screen of the electronic device and obtain reflected light intensity distribution information in the reflection area; and a focusing point calibration submodule 22 arranged to determine the first area with the highest light intensity according to the reflected light intensity distribution information in the reflection area, calculate a geometric center position coordinate of the first area and determine the calculated geometric center position coordinate as the focusing point coordinate of image shooting.

In one embodiment, a plurality of photoinduction points are provided at corresponding positions in the screen of the electronic device, and position coordinates of all of the photoinduction points are saved in the electronic device;

The photoinduction submodule 21 is further arranged to construct the reflection area according to photoinduction points which receive the reflected light in the electronic device, obtain a light intensity value of each photoinduction point in the reflection area, and save a corresponding relationship between a position coordinate of each photoinduction point and the light intensity value in the reflection area, wherein position coordinates of all of the photoinduction points in the reflection area and the corresponding light intensity values thereof constitute the reflected light intensity distribution information in the reflection area.

In one embodiment, the focusing point calibration submodule 22 is further arranged to compare light intensity values of all of the photoinduction points in the reflection area with a preset first light intensity threshold value, select photoinduction points in which a time during which the light intensity values are kept to be greater than or equal to the first light intensity threshold value reaches a preset first time to constitute the first area, and record the position coordinates of all of the photoinduction points in the first area.

In one embodiment, the focusing point calibration submodule 22 is further arranged to calculate the geometric center position coordinate of the first area by the following way:

acquiring position coordinates $(X1, Y1), \ldots, (Xn, Yn)$ of photoinduction points located around the edge of the first area, and calculating the geometric center position coordinate as $((X1+ \ldots +Xn)/n, (Y1+ \ldots +Yn)/n)$ according to the acquired position coordinates of the photoinduction points;

that is, an abscissa of the geometric center position coordinate is a sum of abscissas of all of the photoinduction points around the edge of the first area divided by n, and an ordinate of the geometric center position coordinate is a sum of ordinates of all of the photoinduction points around the edge of the first area divided by n;

wherein, n is an integer greater than 1.

In one embodiment, in the case of video shooting, after the electronic device opens the image shooting mode and determines the focusing point coordinate, the photoinduction submodule 21 is further arranged to, in a video shooting process, trace the reflection area on the screen and a change in the reflected light intensity distribution information in the reflection area in real time according to the reflected light received on the screen of the electronic device; and the focusing point calibration submodule 22 is further arranged to update the first area in real time according to the change, and update the focusing point coordinate.

Preferably, the photoinduction submodule 21 is further arranged to, in the video shooting process, construct a new reflection area in real time according to the photoinduction points receiving the reflected light in the electronic device, obtain a light intensity value of each photoinduction point in the new reflection area, and save a corresponding relationship between a position coordinate of each photoinduction point and the light intensity value in the new reflection area; and the focusing point calibration submodule 22 is further arranged to compare light intensity values of all of the photoinduction points in the new reflection area with a preset first light intensity threshold value, select photoinduction points in which a time during which the light intensity values are kept to be greater than or equal to the first light intensity threshold value reaches a preset second time to constitute a new first area, and record position coordinates of all of the photoinduction points in the new first area;

wherein a length of the second time is less than or equal to a length of the first time.

Preferably, the apparatus further includes a shooting module arranged to, after the focusing module determines the focusing point coordinate of image shooting, complete focusing and image shooting according to the focusing point coordinate.

It should be noted that, the auxiliary light module 10 described above can be implemented by an auxiliary light emitter of the electronic device, the photoinduction submodule 21 can be implemented by an optical inductor of the electronic device, the focusing point calibration submodule 22 can be implemented by a Central Processing Unit (CPU), a Micro Processing Unit (MPU), a Digital Signal Processor (DSP) or a Field-Programmable Gate Array (FPGA) of the electronic device, and the shooting module can be implemented by a camera of the electronic device.

Figure 6:
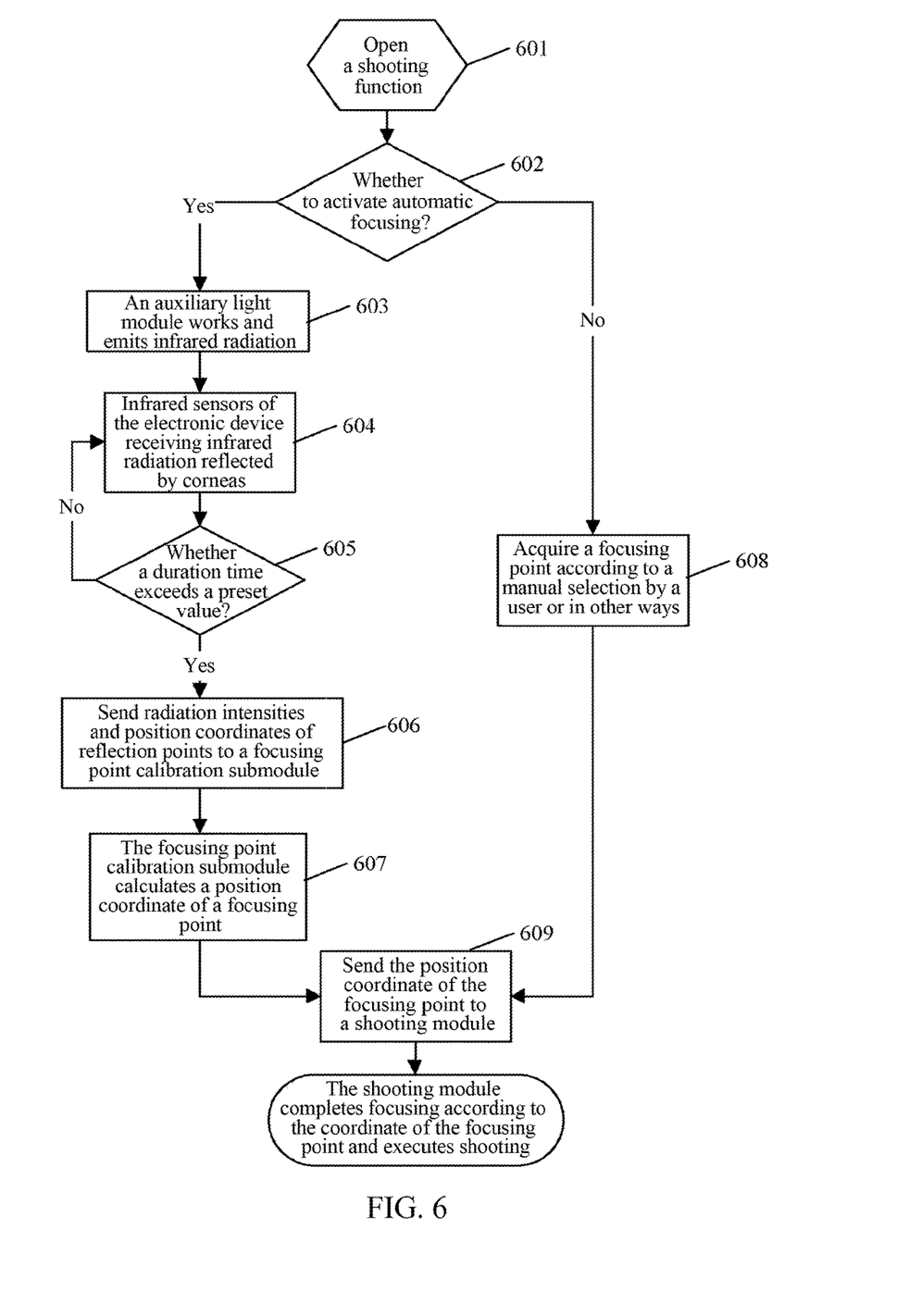
FIG. 6 is a flow chart of an automatic focusing method in a video shooting process according to an embodiment of the present document.

Taking an infrared light source as an example, a method for automatic focusing in the video shooting process according to an embodiment of the present document will be described below in detail in combination with FIG. 6. As shown in FIG. 6, the method mainly includes the following steps.

In step 601, the electronic device opens a shooting function.

In step 602, the electronic device determines whether to activate an automatic focusing function, which can be chosen by the user. If yes, step 603 is executed, and if no, step 608 is executed.

In step 603, an auxiliary light module of the electronic device starts to work, and emits infrared radiation light.

In step 604, infrared sensors of the electronic device receive the infrared radiation light reflected by the user's eyeball corneas.

In step 605, a reflection area is constructed according to the infrared sensor receiving the reflected light, a light intensity value detected by each of the infrared sensors in the reflection area is obtained, and a corresponding relationship between a position coordinate of each of the infrared sensors in the reflection area and its light intensity value is saved, position coordinates of all of the infrared sensors in the reflection area and their corresponding light intensity values constituting reflected light intensity distribution information in the reflection area.

Moreover, light intensity values detected by all the infrared sensors in the reflection area are compared with a preset first light intensity threshold value, infrared sensors of which light intensity values are greater than or equal to the first light intensity threshold value are selected, and it is determined whether a duration time during which the light intensity values are greater than or equal to the first light intensity threshold value exceeds a preset first time. If yes, step 606 is executed, and if no, step 604 is executed.

In step 606, the light intensity values and the position coordinates of the infrared sensors of which light intensity values are greater than or equal to the first light intensity threshold value and duration time exceeds the first time are sent to a focusing point calibration submodule.

In step 607, the focusing point calibration submodule calculates a position coordinate of a focusing point according to the received position coordinates of the infrared sensors.

Specifically, the geometric center position coordinate of the first area constituted by the infrared sensors is calculated by:

acquiring position coordinates $(X1, Y1), \ldots, (Xn, Yn)$ of infrared sensors located around the edge of the first area, and calculating the geometric center position coordinate as $((X1+ \ldots +Xn)/n, (Y1+ \ldots +Yn)/n)$ according to the acquired position coordinates of the infrared sensors;

that is, an abscissa of the geometric center position coordinate is a sum of abscissas of all of the infrared sensors around the edge of the first area divided by n, and an ordinate of the geometric center position coordinate is a sum of ordinates of all of the infrared sensors around the edge of the first area divided by n;

wherein n is an integer greater than 1.

The calculated geometric center position coordinate of the first area is the position coordinate of the focusing point.

In step 608, the focusing point is acquired according to manual selection by a user or in other ways.

In step 609, the position coordinate of the focusing point is sent to a shooting module, which completes focusing according to the position coordinate of the focusing point, and starts to execute video shooting.

It should also be noted that, in a video shooting process, the reflection area on the screen and a change in the reflected light intensity distribution information in the reflection area are traced in real time according to the reflected light received on the screen of the electronic device and the first area is updated in real time according to the change and the focusing point coordinate is updated.

Specifically, a new reflection area is constructed in real time according to the infrared sensors receiving the reflected light in the electronic device, a light intensity value of each of the infrared sensors in the new reflection area is obtained, and a corresponding relationship between the position coordinate of each of the infrared sensors in the new reflection area and the light intensity value is saved. Light intensity values of all of the infrared sensors in the new reflection area are compared with a preset first light intensity threshold value, infrared sensors in which a time during which the light intensity values are kept to be greater than or equal to the first light intensity threshold value reaches a preset second time is selected to constitute a new first area, and the position coordinate of each of the infrared sensors in the new first area is recorded, wherein a length of the second time is less than or equal to a length of the first time.

A new focusing point coordinate is recalculated according to the position coordinate of each of the infrared sensors in the new first area.

Therefore, the shooting module smoothly modifies a focal length and performs focusing according to the new position coordinate of the focusing point informed by the focusing point calibration submodule without interrupting the shooting in a focusing point handover process.

The embodiment of the present document further provides a computer readable storage medium comprising a set of computer executable instructions which are used for executing the method for processing image shooting described in the embodiment of the present document.

Those skilled in the art should understand that the embodiments of the present document can be provided as a method, a system or a computer program product. Therefore, forms of hardware embodiment, software embodiment or embodiment combining software and hardware aspects can be used by the present document. Moreover, a form of computer program product implemented on one or multiple computer usable storage media (including but not limited to a disk memory and an optical memory, etc.) which contain computer usable program codes can be used by the present document.

The present document is described with reference to the flow diagrams and/or block diagrams of the method, apparatus (system) and computer program product of the embodiments of the present document. It should be understood that each flow and/or block in the flow diagrams and/or block diagrams and a combination of flows and/or blocks in the flow diagrams and/or block diagrams can be implemented by computer program instructions. These computer program instructions can be provided to an general purpose computer, a special purpose computer, an embedded processor or processors of other programmable data processing devices to generate a machine, such that a apparatus used for implementing functions specified in one or multiple flows of the flow diagrams and/or in one or multiple blocks of the block diagrams is generated through instructions executed by computers or processors of other programmable data processing devices.

These computer program instructions also can be stored in a computer readable memory which can guide computers or other programmable data processing devices to work in a specific way, such that instructions stored in the computer readable memory generate articles of manufacture including instruction apparatuses which implements functions specified in one or multiple flows of the flow diagrams and/or in one or multiple blocks of the block diagrams.

These computer program instructions can also be loaded on computers or other programmable data processing devices, such that a series of operation steps are executed on the computers or other programmable devices to generate processing implemented by the computers, thus instructions executed on the computers or other programmable devices provide steps used for implementing functions specified in one or multiple flows of the flow diagrams and/or in one or multiple blocks of the block diagrams.

The above description is only the preferred embodiments of the present document, and is not used to limit the protection scope of the present document.

What is claimed is:

1. A method for processing image shooting applied to an electronic device with an image shooting function and being equipped with an auxiliary focusing light source, and the method comprising:

activating the auxiliary focusing light source to emit auxiliary light when the electronic device opens an image shooting mode; and determining a first area on a screen of the electronic device according to reflected light received on the screen of the electronic device, and calculating a focusing point coordinate of image shooting according to the first area, wherein, determining a first area on a screen of the electronic device according to reflected light received on the screen of the electronic device and calculating a focusing point coordinate of image shooting according to the first area comprises:

determining a reflection area on the screen according to the reflected light received on the screen of the electronic device, and obtaining reflected light intensity distribution information in the reflection area; and determining the first area with the highest light intensity according to the reflected light intensity distribution information in the reflection area, calculating a geometric center position coordinate of the first area, and determining the calculated geometric center position coordinate as the focusing point coordinate of image shooting.

2. The method according to claim 1, wherein, a plurality of photoinduction points are provided at corresponding positions in the screen of the electronic device, and position coordinates of all of the photoinduction points are saved in the electronic device;

determining a reflection area on the screen according to the reflected light received on the screen of the electronic device and obtaining reflected light intensity distribution information in the reflection area comprises:

constructing the reflection area according to photoinduction points which receive the reflected light in the electronic device, obtaining a light intensity value of each photoinduction point in the reflection area, and saving a corresponding relationship between a position coordinate of each photoinduction point and the light intensity value in the reflection area, wherein position coordinates of all of the photoinduction points in the reflection area and the corresponding light intensity values thereof constitute the reflected light intensity distribution information in the reflection area.

3. The method according to claim 2, wherein, the method further comprises:

if video shooting, after the electronic device opens the image shooting mode and determines the focusing point coordinate and in a video shooting process, tracing the reflection area on the screen and a change in the reflected light intensity distribution information in the reflection area in real time according to the reflected light received on the screen of the electronic device, and updating the first area in real time according to the change, and updating the focusing point coordinate.

4. The method according to claim 3, wherein, in a video shooting process, tracing the reflection area on the screen and a change in the reflected light intensity distribution information in the reflection area in real time according to the reflected light received on the screen of the electronic device and updating the first area in real time according to the change comprises:

constructing a new reflection area in real time according to the photoinduction points receiving the reflected light in the electronic device, obtaining a light intensity value of each photoinduction point in the new reflection area, and saving a corresponding relationship between a position coordinate of each photoinduction point and the light intensity value in the new intensity values are kept to be greater than or equal to the first light intensity threshold value reaches a preset second time, to constitute a new first area, and record position coordinates of all of the photoinduction points in the new first area;

wherein, a length of the second time is less than or equal to a length of the first time.

5. A computer readable storage medium, comprising a set of computer executable instructions which are used for executing the method for processing image shooting according to claim 2.

6. The method according to claim 1, wherein, determining the first area with the highest light intensity according to the reflected light intensity distribution information in the reflection area comprises:

comparing light intensity values of all of the photoinduction points in the reflection area with a preset first light intensity threshold value, selecting photoinduction points, in which a time during which the light intensity values are kept to be greater than or equal to the first light intensity threshold value reaches a preset first time, to constitute the first area, and recording the position coordinates of all of the photoinduction points in the first area.

7. The method according to claim 6, wherein, the method further comprises:

if video shooting, after the electronic device opens the image shooting mode and determines the focusing point coordinate and in a video shooting process, tracing the reflection area on the screen and a change in the reflected light intensity distribution information in the reflection area in real time according to the reflected light received on the screen of the electronic device, and updating the first area in real time according to the change, and updating the focusing point coordinate.

8. The method according to claim 7, wherein, in a video shooting process, tracing the reflection area on the screen and a change in the reflected light intensity distribution information in the reflection area in real time according to the reflected light received on the screen of the electronic device and updating the first area in real time according to the change comprises:

constructing a new reflection area in real time according to the photoinduction points receiving the reflected light in the electronic device, obtaining a light intensity value of each photoinduction point in the new reflection area, and saving a corresponding relationship between a position coordinate of each photoinduction point and the light intensity value in the new reflection area; comparing light intensity values of all of the photoinduction points in the new reflection area with a preset first light intensity threshold value, selecting photoinduction points, in which a time during which the light intensity values are kept to be greater than or equal to the first light intensity threshold value reaches a preset second time, to constitute a new first area, and recording position coordinates of all of the photoinduction points in the new first area;

wherein, a length of the second time is less than or equal to a length of the first time.

9. The method according to claim 1, wherein, calculating a geometric center position coordinate of the first area comprises:

acquiring position coordinates $(X1, Y1), \ldots, (Xn, Yn)$ of photoinduction points located around an edge of the first area, and calculating the geometric center position coordinate as $((X1+ \ldots +Xn)/n, (Y1+ \ldots +Yn)/n)$ according to the acquired position coordinates of the photoinduction points;

wherein, an abscissa of the geometric center position coordinate is a sum of abscissas of all of the photoinduction points around the edge of the first area divided by n, and an ordinate of the geometric center position coordinate is a sum of ordinates of all of the photoinduction points around the edge of the first area divided by n;

wherein, n is an integer greater than 1.

10. The method according to claim 1, wherein, the method further comprises:

if video shooting, after the electronic device opens the image shooting mode and determines the focusing point coordinate and in a video shooting process, tracing the reflection area on the screen and a change in the reflected light intensity distribution information in the reflection area in real time according to the reflected light received on the screen of the electronic device, and updating the first area in real time according to the change, and updating the focusing point coordinate.

11. The method according to claim 10, wherein, in a video shooting process, tracing the reflection area on the screen and a change in the reflected light intensity distribution information in the reflection area in real time according to the reflected light received on the screen of the electronic device and updating the first area in real time according to the change comprises:

constructing a new reflection area in real time according to the photoinduction points receiving the reflected light in the electronic device, obtaining a light intensity value of each photoinduction point in the new reflection area, and saving a corresponding relationship between a position coordinate of each photoinduction point and the light intensity value in the new reflection area; comparing light intensity values of all of the photoinduction points in the new reflection area with a preset first light intensity threshold value, selecting photoinduction points, in which a time during which the light intensity values are kept to be greater than or equal to the first light intensity threshold value reaches a preset second time, to constitute a new first area, and recording position coordinates of all of the photoinduction points in the new first area;

wherein, a length of the second time is less than or equal to a length of the first time.

12. A computer readable storage medium, comprising a set of computer executable instructions which are used for executing the method for processing image shooting according to claim 1.

13. An apparatus for processing image shooting applied to an electronic device with an image shooting function and being equipped with an auxiliary focusing light source, and the apparatus comprising:

a hardware auxiliary light module, arranged to activate the auxiliary focusing light source to emit auxiliary light when the electronic device opens an image shooting mode; and a hardware focusing module, arranged to determine a first area on a screen of the electronic device according to reflected light received on the screen of the electronic device, and calculate a focusing point coordinate of image shooting according to the first area, wherein, the hardware focusing module comprises:

a photoinduction submodule, arranged to determine a reflection area on the screen according to the reflected light received on the screen of the electronic device, and obtain reflected light intensity distribution information in the reflection area; and a focusing point calibration submodule, arranged to determine the first area with the highest light intensity according to the reflected light intensity distribution information in the reflection area, calculate a geometric center position coordinate of the first area, and determine the calculated geometric center position coordinate as the focusing point coordinate of image shooting.

14. The apparatus according to claim 13, wherein, a plurality of photoinduction points are provided at corresponding positions in the screen of the electronic device, and position coordinates of all of the photoinduction points are saved in the electronic device;

the photoinduction submodule is further arranged to construct the reflection area according to photoinduction points which receive the reflected light in the electronic device, obtain a light intensity value of each photoinduction point in the reflection area, and save a corresponding relationship between a position coordinate of each photoinduction point and the light intensity value in the reflection area, wherein position coordinates of all of the photoinduction points in the reflection area and the corresponding light intensity values thereof constitute the reflected light intensity distribution information in the reflection area.

15. The apparatus according to claim 14, wherein, in the case of video shooting, after the electronic device opens the image shooting mode and determines the focusing point coordinate, the photoinduction submodule is further arranged to, in a video shooting process, trace the reflection area on the screen and a change in the reflected light intensity distribution information in the reflection area in real time according to the reflected light received on the screen of the electronic device; and the focusing point calibration submodule is further arranged to update the first area in real time according to the change, and update the focusing point coordinate.

16. The apparatus according to claim 15, wherein, the photoinduction submodule is further arranged to, in the video shooting process, construct a new reflection area in real time according to the photoinduction points receiving the reflected light in the electronic device, obtain a light intensity value of each photoinduction point in the new reflection area, and save a corresponding relationship between a position coordinate of each photoinduction point and the light intensity value in the new reflection area; and the focusing point calibration submodule is further arranged to compare light intensity values of all of the photoinduction points in the new reflection area with a preset first light intensity threshold value, select photoinduction points, in which a time during which the light reaches a preset second time, to constitute a new first area, and record position coordinates of all of the photoinduction points in the new first area;

wherein, a length of the second time is less than or equal to a length of the first time.

17. The apparatus according to claim 13, wherein, the focusing point calibration submodule is further arranged to compare light intensity values of all of the photoinduction points in the reflection area with a preset first light intensity threshold value, select photoinduction points, in which a time during which the light intensity values are kept to be greater than or equal to the first light intensity threshold value reaches a preset first time, to constitute the first area, and record the position coordinates of all of the photoinduction points in the first area.

18. The apparatus according to claim 13, wherein, the focusing point calibration submodule is further arranged to calculate the geometric center position coordinate of the first area by the following way:

acquiring position coordinates $(X1, Y1), \ldots, (Xn, Yn)$ of photoinduction points located around an edge of the first area, and calculating the geometric center position coordinate as $((X1+ \ldots +Xn)/n, (Y1+ \ldots +Yn)/n)$ according to the acquired position coordinates of the photoinduction points;

wherein, an abscissa of the geometric center position coordinate is a sum of abscissas of all of the photoinduction points around the edge of the first area divided by n, and an ordinate of the geometric center position coordinate is a sum of ordinates of all of the photoinduction points around the edge of the first area divided by n;

wherein, n is an integer greater than 1.

19. The apparatus according to claim 13, wherein, in the case of video shooting, after the electronic device opens the image shooting mode and determines the focusing point coordinate, the photoinduction submodule is further arranged to, in a video shooting process, trace the reflection area on the screen and a change in the reflected light intensity distribution information in the reflection area in real time according to the reflected light received on the screen of the electronic device; and the focusing point calibration submodule is further arranged to update the first area in real time according to the change, and update the focusing point coordinate.

20. The apparatus according to claim 19, wherein, the photoinduction submodule is further arranged to, in the video shooting process, construct a new reflection area in real time according to the photoinduction points receiving the reflected light in the electronic device, obtain a light intensity value of each photoinduction point in the new reflection area, and save a corresponding relationship between a position coordinate of each photoinduction point and the light intensity value in the new reflection area; and the focusing point calibration submodule is further arranged to compare light intensity values of all of the photoinduction points in the new reflection area with a preset first light intensity threshold value, select photoinduction points, in which a time during which the light intensity values are kept to be greater than or equal to the first light intensity threshold value reflection area; comparing light intensity values of all of the photoinduction points in the new reflection area with a preset first light intensity threshold value, selecting photoinduction points, in which a time during which the light intensity values are kept to be greater than or equal to the first light intensity threshold value reaches a preset second time, to constitute a new first area, and recording position coordinates of all of the photoinduction points in the new first area;

wherein, a length of the second time is less than or equal to a length of the first time.

* * * * *